United States Patent

Thomas

[15] 3,687,919
[45] Aug. 29, 1972

[54] POLYMERIZATION IN MASS OF ETHYLENIC MONOMERS AND PRODUCTS PRODUCED THEREBY

[72] Inventor: Jean Claude Thomas, Lyon, Rhone, France

[73] Assignee: Produits Chimiques Pechiney-Saint-Gobain, Paris, France

[22] Filed: March 17, 1966

[21] Appl. No.: 535,092

[30] Foreign Application Priority Data

March 17, 1965 France.....................659561

[52] U.S. Cl............260/87.1, 260/86.3, 260/87.5 R, 260/87.7
[51] Int. Cl...........C08f 1/04, C08f 3/30, C08f 15/30
[58] Field of Search....................260/87.5, 92.8, 87.1

[56] References Cited

UNITED STATES PATENTS 2,961,432  11/1960  Fikentscher et al. ......260/92.8
3,102,087  8/1963  Jobard......................260/92.8
3,480,606  11/1969  Thomas.....................260/92.8

FOREIGN PATENTS OR APPLICATIONS

1,382,072  11/1964  France......................260/92.8

Primary Examiner—Joseph L. Schofer
Assistant Examiner—John A. Donahue, Jr.
Attorney—John L. Seymour and Arthur W. Dew

[57] ABSTRACT

A process of producing spherical particles of ethylenic monomers with controlled size distribution by prepolymerizing a portion of the monomer with turbulent agitation, transferring the prepolymerized monomer and mixing it with a large quantity of additional monomer and slowly and mild agitation polymerizing the bulk of the monomer. The quantity of monomer prepolymerized and the speed of agitation during prepolymerization serving as controls on the size distribution of the final product.

11 Claims, 4 Drawing Figures

INVENTOR
JEAN CLAUDE THOMAS

POLYMERIZATION IN MASS OF ETHYLENIC MONOMERS AND PRODUCTS PRODUCED THEREBY

This invention relates in particular to the preparation of polyvinyl chloride in mass, that is to say in the absence of solvents and diluents, and in general to the polymerization in mass of ethylenic monomers the polymers of which are insoluble in their monomers. The term polymerization includes both homopolymerization and copolymerization.

It has been proposed in U.S. application Ser. No. 347,147, now abandoned, to polymerize such monomers to about 7 to 15 percent of completion in an initial stage of turbulent agitation and to complete the polymerization to a selected end point, for instance around 70–75 percent, in a second stage removed from the first in time and place, with mild agitation. In the first stage the agitation is as turbulent as the nature of the process permits and in the second stage it is as mild as will maintain uniform conditions of temperature. The polymerization was carried out under conditions of temperature, pressure and catalysis favorable to the polymerization reaction. The temperatures employed, the corresponding pressures, and the catalysts used were typical of the prior art, as they are in the present invention.

It would be ideal to produce polyvinyl chloride grains all of one size and shape, for instance spheres 300 microns in diameter, but the prior art produced neither such sizes nor such shapes; the sizes were heterogeneous, from minute particles passing readily through a 100 micron screen to large aggregates greater than 630 microns in size. The shapes were flaky and irregular in every dimension. It was an object of the identified case, as it is an object of this one, to produce such polymers in regular spherical grains with an approach to uniformity of size. A breakthrough was obtained in U.S. application Ser. No. 97,982, now abandoned, wherein polyvinyl chloride was produced in spherical grains with a rough approximation of equal size. The case first identified exhibited a massive improvement in granulometry; the spherical grains constituted a larger percentage of the total production and variation in size was much reduced.

It is an object of the present invention to still further improve the granulometry (size, shape, and density) of ethylenic polymers by production in mass. It is also a particular object of this invention to improve the efficiency of the new process which is represented by these cases. Another object is to produce spherical grains of excellent granulometry by a new method.

The objects of the invention are accomplished by a method of polymerizing ethylenic monomers capable of polymerization in mass, which comprises subjecting such an ethylenic monomer in mass to conditions of temperature, pressure, and catalysis favorable to polymerization in a locus provided with agitation of sufficient violence to achieve major turbulence in the reaction mass until about 7 to 15 percent polymerization has been attained, the minute particles of polymer thus formed being suspended in liquid monomer, transferring the liquid suspension to another locus provided with mild agitation, mixing it with additional monomer, and containing the polymerization in mass under conditions favorable to growth of the particles, including agitation which is a function of good temperature control and achieves only minor turbulence, and conditions of temperature, pressure, and catalysis favorable to polymerization.

It will assist in comprehending the difference between the product of these cases and the product of the prior art to regard the product of the prior art as produced by random polymerization in random directions whereas the new product is produced by regular growth in all directions.

As the production of polyvinyl chloride is particularly valuable, this description will be directed mainly to its formation by the novel process and it is to be understood that this is a representative disclosure and that the process can be applied to other ethylenic monomers in which their polymers are insoluble. Examples include the comonomers hereinafter listed, vinyl compounds such as styrene and vinylidine chloride and acrylic monomers.

According to the present invention the polymerization includes two stages, in the first of which the monomer, for instance vinyl chloride, is received in an autoclave under satisfactory conditions of temperature, pressure and catalysis and undergoes polymerization to 7 to 15 percent and preferably 8 to 10 percent, with turbulent agitation, the agitation in this stage being generally the more satisfactory as it is the higher. When this stage of polymerization has been reached and the solid polyvinyl chloride in minute particles is suspended in the liquid monomer, the suspension is flowed into another pool of monomer and the polymerization is continued with mild agitation. In this second stage the agitation is as mild as will produce a good temperature control of the entire reaction mass.

The catalysts employed are those which are normally used with the particular polymer involved. Lists are available in publications dealing with the subject.

In the good practice of the present invention the quantity of monomer used in the first stage should be at least one-third by weight of the total quantity of monomer which is to undergo the reaction. The autoclave will receive, for example, one-third to one-half of the total charge, which will undergo the partial polymerization with turbulent agitation and the second autoclave will then receive the remainder of the monomer and the partly polymerized fluid and the total will undergo the second stage with mild agitation.

This process appears to involve a new phenomenon, the formation of minute seeds of polymer in the first stage, and the regular expansion of these seeds, by regular growth in all directions, to the formation of spherical grains of greater regularity in the second stage. There appears to be little if any new seed formation in the second stage, the second stage being devoted largely to the expansion of the seeds of the first stage.

The lower limit of one-third is not equatorial but a boundary of good practice when the monomer is vinyl chloride. It is possible to make positive or negative modifications as the function of the general reaction conditions and of the type of monomer being polymerized. In particular, the degree of turbulence in the first stage, a measure of which is the speed of the agitator in the autoclave, has an important effect as the greater the turbulence, the higher the speed of agitation, the greater the number of minute particles formed. This, in turn, has a determinative effect on the average size of the spherical grains which are produced.

For general conditions relating to polymerization which are applicable to the present case French Pat. No. 1,357,736 may be consulted.

The following examples illustrate the invention. For better comprehension of what follows, the drawings illustrate the types of apparatus employed.

Each of these types of apparatus has its own characteristics of operation which will be described in the following examples.

EXAMPLE 1

(Comparative Example)

In the application identified above, there is described the polymerization of vinyl chloride in mass, in two steps of prepolymerization and final polymerization, in which the prepolymerization was carried out on the totality of the monomer. The present example is of that type.

A vertical prepolymerizer, similar to that in the drawings, of 200 l., in stainless steel, provided with a turbine agitator 180 mm. in diameter received 187 kg. of vinyl chloride and 30.6 g. (0.018 percent of the weight of the monomer) of azodiisobutyronitrile (ADBN) as a catalyst, after the apparatus had been purged with 17 kg. of vinyl chloride. The turbine was driven at 710 r.p.m. throughout the test. The temperature was raised rapidly to 62° C. and the pressure stabilized itself at 9.3 bars in the prepolymerizer.

Figure 2:
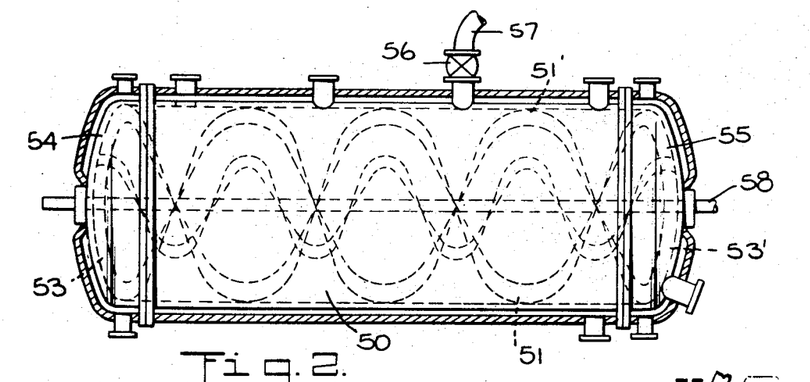
FIG. 2 is a vertical section through a horizontal autoclave of fixed type provided with helical agitators having inner and outer, oppositely pitched blades mounted on a shaft 58 which is appropriately driven. This autoclave is connected to the prepolymerizer by pipe 57 and valve 56.

After 3 hours the mixture of monomer and polymer contained between 7 and 15 percent of polymer, and it was transferred to an autoclave of 500 l. capacity of the type shown in FIG. 2, this autoclave having been purged with 20 kg. of vinyl chloride monomer. The transfer took less than a minute. The valves were closed and the agitator was rotated at 8 r.p.m. the temperature of the reaction mass was kept at 62° C., corresponding to 9.3 bars. The operation continued for 12 hours for a total of 15 hours. The yield was 72 percent of a polymer powder having a K value of 62 and an apparent density of 0.58. Its granulometry was:

TABLE I

| Screen apertures in microns | 630 | 500 | 400 | 315 | 250 | 200 | 160 | 100 |
|---|---|---|---|---|---|---|---|---|
| % fallthrough | 99.5 | 99 | 98 | 97 | 96 | 94 | 49 | 1 |

Ninety six percent was smaller than 250 microns, 94 percent smaller than 200 microns and 49 percent smaller than 160 microns.

EXAMPLE 2

(This Invention)

The apparatus was similar to that described in Example 1. A prepolymerizer received 100 kg. of vinyl chloride after purging and 18 g., 0.018 percent, ADBN catalyst. The temperature rose rapidly to 62° C. and the internal pressure was 9.3 bars.

After 3 hours of prepolymerization, between 7 and 15 percent of the polymer had formed and the mass was flowed into 100 kg. of vinyl chloride, containing 18 g. of ADBN, in the autoclave of FIG. 2. The transfer took less than a minute. The agitator in the cylindrical autoclave was rotated at 8 r.p.m., the temperature was 62° C. and the pressure was 9.3 bars. Polymerization continued 12 hours, for a total of 15 hours. The yield was 64.6 percent of a powder having a K value of 62 and an apparent density of 0.57. The granulometry is as follows:

TABLE II

| Screen apertures in microns | 630 | 500 | 400 | 315 | 250 | 200 | 160 | 100 |
|---|---|---|---|---|---|---|---|---|
| % fallthrough | 97 | 97 | 96 | 96 | 95 | 91 | 3 | 1 |

It will be observed that 49 percent of sizes less than 160 microns were separated, in the first examples above. Eighty-eight percent of the particles were between 160 microns and 200 microns and this is a substantial advantage for some uses, in the last example.

EXAMPLE 3

The apparatus was the same as in Examples 1 and 2. Only one-third of the monomer was subjected to prepolymerization. Seventy-five kg. of vinyl chloride were admitted to the purged prepolymerizer with 13.5 g., 0.018 percent, of ADBN. The agitator ran at 710 r.p.m., the temperature was 62° C. and the pressure 9.3 bars.

After 3 hours the partly polymerized reaction mass was flowed into the cylindrical autoclave which contained 150 kg. of vinyl chloride monomer and 27 g., 0.018%, of ADBN. The transfer took less than a minute. The agitation was at 8 r.p.m., the temperature at 62° C. and the relative internal pressure 9.3 bars. Polymerization was for 12 hours for a total of 15 hours. The yield was 70.4 percent of a polymer having a K value of 62 and an apparent density of 0.54. The granulometry was:

TABLE III

| Screen apertures in microns | 630 | 500 | 400 | 315 | 250 | 200 | 160 | 100 |
|---|---|---|---|---|---|---|---|---|
| % fallthrough | 100 | 99 | 98 | 97 | 95 | 20 | 7 | 1 |

The granulometry is substantially different from the preceding examples, 75 percent of the particles being between 200 and 250 microns, where only 4 percent were in this size in the product of Example 2 and only 2 percent in the product of Example 1. It is thus apparent that the process makes it possible to produce particles of chosen granulometry. In each of these cases the products were tiny spheres.

EXAMPLE 4

The purged prepolymerizer of Example 1 received 75 kg. of vinyl chloride and 13.5 g. of ADBN. The temperature rose rapidly to 62° C. and the pressure to 9.3 bars.

After 3 hours the reaction mass was transferred to the cylindrical autoclave and charged with 27 g. of ADBN. The valve between the autoclaves was closed and 165 kg. of the same monomer were pumped into the prepolymerizer at 62° C. and used to rinse that vessel. The rinsed polymer was immediately transferred to the cylindrical autoclave and the polymerization continued at 62° C. for 12 hours 30 minutes with agitation at 8 r.p.m. The yield was 69.6 percent of the polymer having a K value of 62 and an apparent density of 0.55. Its granulometry was:

TABLE IV

| Screen apertures in microns | 630 | 500 | 400 | 315 | 250 | 200 | 160 | 100 |
|---|---|---|---|---|---|---|---|---|
| % fallthrough | 99 | 98 | 97 | 95 | 94 | 25 | 9 | 1 |

This is quite similar to the granulometry of Table III of Example 3.

EXAMPLE 5

A prepolymerizer, a vertical autoclave of stainless steel with a capacity of 2 m.$^3$ equipped with a turbine agitator of 350 mm. diameter rotating at 700 r.p.m., received 1,700 kg. of vinyl chloride monomer and 96.36 g. of acetyl cyclohexanesulfonyl peroxide (ACSP) which provided 6.8 g. or 0.0004 percent of active oxygen. The reaction temperature was set at 55° C. and the internal pressure was 7.85 bars. Polymerization was for 1 hour 15 minutes after which the catalyst was practically destroyed. This catalyst is of the type called "rapid" because it acts vigorously and decomposes rapidly. The yield was 9.2 percent of polymer and the polymerization had been arrested. This reaction mass was transferred to an autoclave of the type of FIG. 2 of 12 m.$^3$ capacity. The helical agitator was rotated at 5 r.p.m. The prepolymerizer was rinsed with 500 kg. of the same monomer which was immediately transferred to the cylindrical autoclave. 1,200 kg. of monomer were introduced into the cylindrical autoclave together with 2,210 g. of lauroyl peroxide catalyst (0.065 percent of the total monomer). The reaction mass was rapidly raised to 55° C. at a pressure of 7.85 bars and the polymerization continued for 17 hours at the mild rate of agitation. The residual monomer was then vented. The yield was 70.3 percent of powdery polymer of apparent density 0.5 and K index (Fikentscher) of 68. The granulometry was:

TABLE V

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 98 | 98 | 96 | 21 |

Seventy-five percent of the particles were between 100 and 160 microns and 96 percent less than 160 microns in size. This example further illustrates the manner in which the average size of the grains of the product can be controlled.

EXAMPLE 6

The apparatus of Example 5 was used. The prepolymerizer received the same amount of monomer and catalyst and was run under the same conditions. The yield of polymer was 9.6 percent and the mass was transferred to the cylindrical autoclave. The prepolymerizer was rinsed as in Example 5 and was transferred to the polymerizer which also received 2,800 kg. of monomer. Thus, only one-third of the monomer had been submitted to polymerization. The main autoclave then received 3.250 kg. of lauroyl peroxide catalyst (0.065 percent of the monomer). Polymerization continued for 15 hours 30 minutes at 55° C. with the same mild agitation. The yield was 73 percent of polymer having a density of 0.35 and a K value of 68. The granulometry was:

TABLE VI

| Screen apertures in microns | 630 | 500 | 400 | 315 | 250 | 200 | 160 | 100 |
|---|---|---|---|---|---|---|---|---|
| % fallthrough | 97 | 96 | 94 | 92 | 85 | 62 | 22 | 0.5 |

In this case the density of the product was sharply reduced and the grain sizes are more widely dispersed, which is, for some purposes, not particularly desirable. These undesirable features can be eliminated, when only one-third of the monomer is prepolymerized, by using a higher speed of agitation than that employed in the two examples. For example doubling the velocity therein recited will produce results similar to Examples 3 and 4.

EXAMPLE 7

The apparatus was that of Example 5. The prepolymerizer was purged by vinyl chloride and then received 1,579.6 kg. of vinyl chloride, 120.4 kg. of vinyl acetate, and 96.36 g. of ACSP, which corresponds to 0.0004 percent of active oxygen. The temperature of the comonomer is raised to 62° C. which corresponds to an internal pressure of 9.3 bars. The reaction became inert at 1 hour 15 minutes and the conversion was about 9.5 percent. The reaction mass was transferred to the big autoclave. The prepolymerizer was rinsed with 500 kg. of vinyl chloride and added to the big autoclave, which also received 1,079.6 kg. of vinyl chloride and 120.4 kg. of vinyl acetate. It also received 612 g. of ADBN (slow catalyst). The reaction medium was rapidly raised to 62° C. which corresponded to 9.3 bars. The polymerization was continued 11 hours with the agitator at 5 r.p.m. After venting, a yield of 75.2 percent of the total monomer was received. It had a K value of 56 and an apparent density of 0.69. Its granulometry was:

TABLE VII

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 94 | 92 | 88 | 10 |

Seventy-eight percent of the particles were between 100 and 160 microns and 92 percent were less than 200 microns in size.

It is an object of this invention to control certain qualities of the new product, and its granulometry, at will and to this effect we have discovered that particular types of apparatus may be employed to achieve particularly desirable results, and that this is particularly true when the process involves the development of minute seeds in a small quantity of monomer and the regular enlargement of those seeds to spherical granules of commercially desirable sizes in a large body of monomer. It will be understood that in the term monomer we include single monomers and pluralities of compatible monomers, and that the compatibility of other monomers and vinyl chloride to form useful copolymers has been largely investigated and published elsewhere. The examples given herein are for illustrative purposes to demonstrate the applicability of the new process to the techniques of copolymerization.

The apparatus used in Examples 8, 9, 10, 11 and 12 included a prepolymerizer coupled to a rotary, cylindrical autoclave in the bottom of which was a line of loose metal balls which roll through the reaction mass as the autoclave turns keeping it in constant agitation while it is still liquid and fluidizing the product when it has passed into the granular, solid, phase.

These examples demonstrate particularly close control of the dimensions and granulometry of the polymers.

EXAMPLE 8

Figure 1:
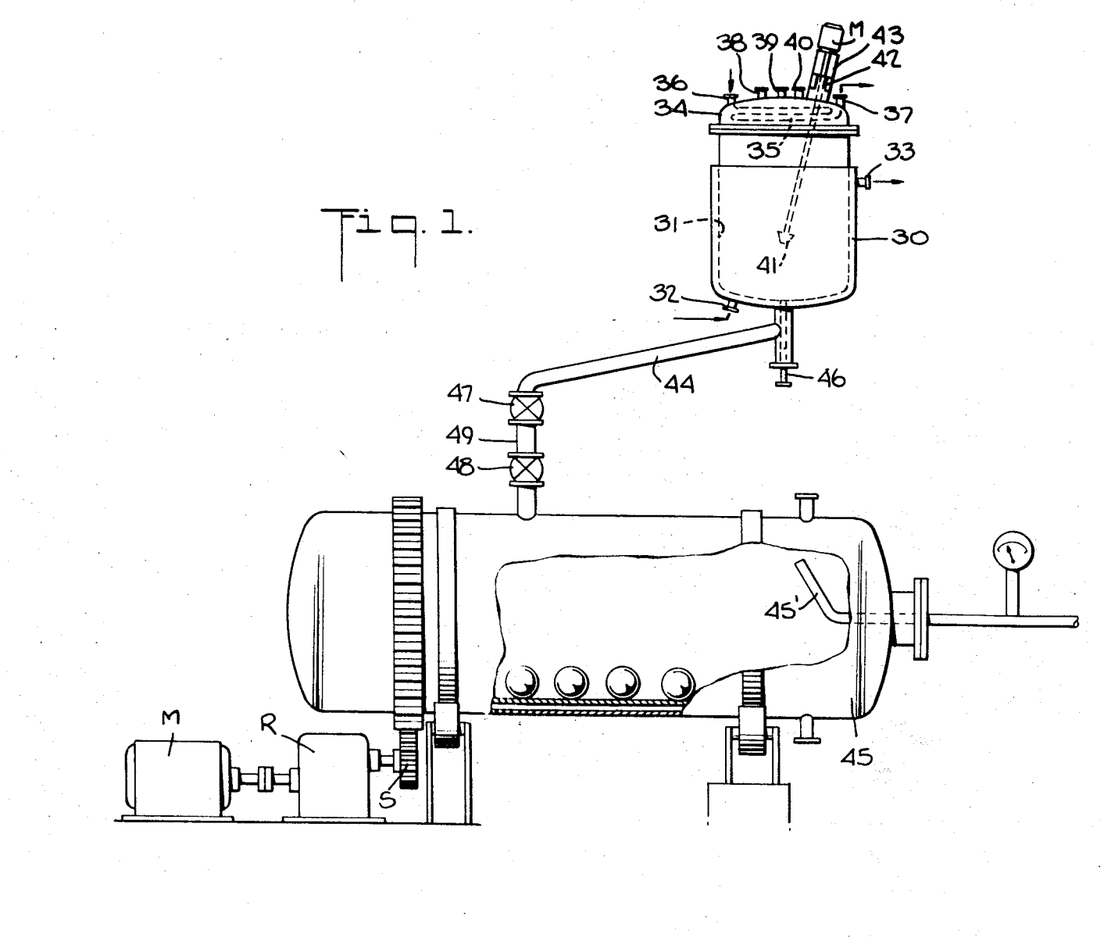
FIG. 1 illustrates a prepolymerizer 30 with inlet 32 and outlet 33 to a water jacket 31 which may be used for heating and cooling the contents of the autoclave. A cover is removable and is furnished with a heating and cooling coil served through inlet 36 and outlet 37. Ports 38, 39, and 40, appropriately valved, permit the filling, discharge and servicing of the contents of the autoclave. A motor M mounted on the cover drives an impeller 41. Valve 46 allows the contents of the autoclave to flow through pipe 44 and valves 47, 48 to a large autoclave which is of known type comprising a rotary cylinder driven from motor M through gears S and containing a line of balls which fluidize the polymer by rolling through it.

This example is for comparative purposes and describes the polymerization of vinyl chloride using a single catalyst, the prepolymerization being carried out on the entire monomer in the pressure of all the catalyst. A vertical prepolymerizer of 1 m.$^3$ capacity, as illustrated in FIG. 1, received 825 kg. of vinyl chloride, after purging, and 150 g. (0.02 percent of the monomer) of ADBN. The agitator was of impeller type 220 mm. in diameter run at 720 r.p.m. The temperature was 62° C., the pressure 9.5 bars, and after 2 hours 45 minutes the reaction mass was transferred to a rotary autoclave, which was of 3 m.$^3$ capacity containing 50 balls 160 mm. in diameter. It rotated at 8 r.p.m. and the polymerization continued at 62° C. for 11 hours 15 minutes. The speed was reduced to 3 r.p.m., the autoclave was vented, and the product extracted. There was a yield of 68.2 percent of spherical grains having a K value of 62, an apparent density of 0.53 and the following granulometry:

TABLE VIII

| Screen apertures in microns | 630 | 500 | 400 | 315 | 250 | 200 | 160 | 100 |
|---|---|---|---|---|---|---|---|---|
| % fallthrough | 97 | 96 | 94 | 92 | 90 | 86 | 82 | 3.5 |

Eighty-two percent of the particles were of dimensions less than 160 microns.

EXAMPLE 9

The present invention was carried out in the apparatus of Example 8 under the following comparable conditions:

The prepolymerizer received 500 kg. of vinyl chloride, after purging, and 100 g. of ADBN (0.02 percent). After 2 hours 45 minutes of prepolymerization the mass was transferred to the rotary autoclave which had already received 500 kg. of vinyl chloride, after purging. One-hundred g. of ADBN were added to the rotary autoclave (0.01 percent) and the temperature was established at 62° C. and 9.5 bars. Polymerization was continued for 11 hours 45 minutes, the autoclave was vented, and the yield was 69.8 percent of spherical granules having an apparent density of 0.55. The granulometry was:

TABLE IX

| Screen apertures in microns | 630 | 500 | 400 | 315 | 250 | 200 | 160 | 100 |
|---|---|---|---|---|---|---|---|---|
| % fallthrough | 99 | 99 | 98 | 97 | 95 | 90 | 85 | 2 |

The granulometry was concentrated in limited sizes, 85 percent of the particles being less than 160 microns and 83 percent between 100 and 160 microns.

EXAMPLE 10

Using the same apparatus, the process was carried out using a rapid catalyst (a catalyst of rapid decomposition) in the prepolymerizer and a slow catalyst (a catalyst of long life) in the rotary autoclave.

The prepolymerizer received 500 kg. of vinyl chloride (about one-half), after purging, and 27.75 g. of ASCP, which furnished 0.0004 percent of active oxygen based on the weight of the monomer in the prepolymerizer. After 1 hour and 15 minutes of polymerization at 62° C. and 9.5 bars, the speed of the impeller being as aforesaid, the catalyst was exhausted and the reaction mass was transferred to the rotary autoclave, which had been purged and charged with 500 kg. of vinyl chloride and 200 g. of ADBN (0.02 percent of the reaction medium). Polymerization continued for 11 hours at 62° C., 9.5 bars pressure, and 8 r.p.m. The speed was reduced to 3 r.p.m., the apparatus was vented, and the product discharged with a yield of 70.2 percent of spherical granules of apparent density 0.55 and the following granulometry:

TABLE X

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 96 | 92 | 88 | 4 |

If the results obtained in Examples 8, 9 and 10 be compared, it will be observed that an identical total polymerization was used and that the granulometry of the product of Example 10 was 88 percent less than 160 microns and 84 percent between 100 and 160 microns.

EXAMPLE 11

The apparatus used and the superficial conditions of polymerization were the same as the Example 8 but only one-third of the total monomer was prepolymerized and the prepolymerization was by a rapid catalyst and the polymerization with mild agitation in the presence of slow catalyst.

The prepolymerizer received 350 kg. of vinyl chloride and 19.425 g. of ACSP, which yielded 0.0004 percent of active oxygen. After 1 hour 15 minutes of prepolymerization at 720 r.p.m., 62° C., and 9.5 bars, the catalyst became inert and the reaction mass was transferred to the purged rotary autoclave which had received 700 kg. of vinyl chloride and 140 g. of ADBN. The reaction proceeded for 12 hours at 62° C. and 9.5 bars at 8 r.p.m. The yield was 69.3 percent of spherical granules having an apparent density of 0.47 and the following granulometry:

TABLE XIa

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 94 | 80 | 25 | 5 |

Comparing this example with Examples 8, 9 and 10, the apparent density in this example is less than the others, the granular sizes are more widely dispersed, and the average dimensions of the parties are larger, as only 80 percent are inferior to 200 microns and only 55 percent between 160 and 200 microns.

The same polymerization was carried out with the sole difference that the speed of the prepolymerizer agitator was raised from 720 r.p.m. to 1,420 r.p.m. The product had the following granulometry:

TABLE XIb

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 96 | 90 | 80 | 5 |

The apparent density was 0.47 but the grain sizes are more concentrated, 90 percent of the particles being less than 200 microns and 80 percent less than 160 microns and 75 percent between 100 and 160 microns.

EXAMPLE 12

The apparatus was that of Example 8 and FIG. 1. The prepolymerizer received 475 kg. of vinyl chloride and 25 kg. of vinyl acetate. The catalyst was ACSP of which 27.75 g. yielded 0.0004 percent of active oxygen. After 1 hour 15 minutes of polymerization at 720 r.p.m., 62° C. and 9.5 bars, the catalyst was inert and the reaction mass was transferred to the rotary autoclave which contained 475 kg. of vinyl chloride, 25 kg. of vinyl acetate, and 200 g. of ADBN (0.02 percent). The polymerization proceeded for 10 hours at 62° C., 9.5 bars, and 8 r.p.m. for a total duration of reaction of 11 hours 15 minutes. The product had a yield of 73.2 percent, an apparent density of 0.66 and a K value of 56. The granulometry was:

TABLE XII

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 95 | 87 | 72 | 2 |

Eighty-seven percent of the particles were less than 200 microns and 70 percent between 100 and 160 microns.

In this process the prepolymerizer need not be of the type illustrated in the drawings, although that type is of excellent performance. It might also be of any of the types of cylindrical autoclave shown in the figures, although smaller and equipped for higher speeds. Equal speeds of different types of autoclave are not comparable in effect. For instance, a speed of 720 r.p.m. in the propeller type impeller of FIG. 1 may be equivalent in turbulent effect to a speed of 100 r.p.m. in the paddle wheel of FIG. 3, and it may be mechanically difficult to attain equal violence with the rotary autoclave of FIG. 1. Consequently, in considering this invention we must consider the first stage to be a stage of high turbulence and the second to be of mild turbulence, but consistent with good temperature control and homogeneity of the reaction mass. In consequence the first autoclave will be of a type capable of assuring all necessary turbulence and the second of a type assuring minimum turbulence consistent with heat control. FIG. 1 shows a combination of desirable types, each efficient in its own operation.

Figure 3:
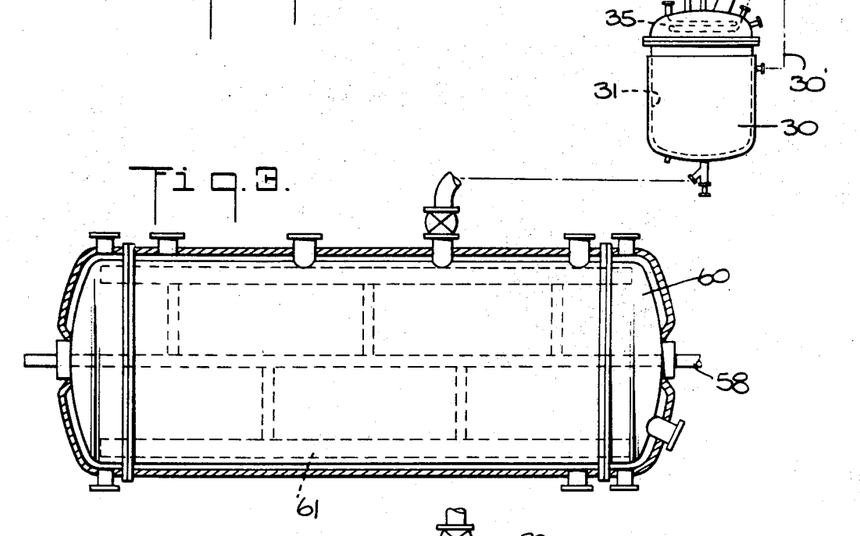
FIGS. 3 and 4 are vertical sections through similar autoclaves, connected to the prepolymerizer, in which stirring is accomplished by full length or short length stirrers of paddle type.
Figure 4:
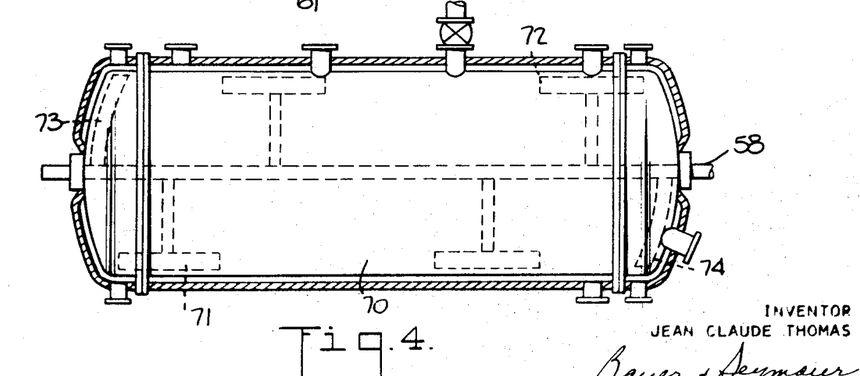

Although the rotary autoclave of FIG. 1 serve their purpose efficiently, there is mechanical difficulty in constructing them particularly when they are of large size. It is consequently, desirable that equivalent results be attained by fixed autoclaves and this has been achieved in the present invention by the use of second stage autoclaves such as those of FIGS. 3 and 4. In FIG. 3 there is a central shaft 58 which has oppositely disposed arms carrying full length paddles nest to the walls of the autoclave. In FIG. 4 the construction is similar except that the paddles are not full length. The characteristics of these autoclaves differ from each other and from those of the autoclaves of FIGS. 1 and 2. Throughout the examples, for comparative purposes, we have used only one type of prepolymerizer and one set of standard conditions, which is not to be taken to constitute a limitation.

EXAMPLE 13

A vertical autoclave of 200 l. capacity of stainless steel, provided with a turbine type agitator was purged and received 170 kg. of vinyl chloride and 30.6 g. of ADBN. The temperature was 62° C., the pressure 9.5 bars, and the speed was 720 r.p.m. This is a comparative example in which the entire quantity of monomer was put into the prepolymerizer.

After 3 hours of polymerization the mixture of polymer suspended in monomer was transferred to a 500 l. stainless steel horizontal autoclave of the type shown in FIG. 3, the agitator of which was rotated at 30 r.p.m As the transfer began, cold water was circulated through the jacket of the horizontal autoclave to increase the pressure gradient and speed up the transfer, which took less than 1 minute. The valve was then closed between the autoclaves. The temperature was raised to 62° C. and polymerization continued 13 hours. The yield was 70 percent of a spherical powder having a K value of 62 and an apparent density of 0.56. The granulometry was:

TABLE XIII

| Screen apertures in microns | 630 | 500 | 400 | 315 | 250 | 200 | 160 | 100 |
|---|---|---|---|---|---|---|---|---|
| % fallthrough | 98 | 98 | 97 | 95 | 95 | 93 | 82 | 7 |

EXAMPLE 14

The apparatus was the same as that used in Example 13. 100 kg. of vinyl chloride were admitted to the purged prepolymerizer with 20 g. of ADBN catalyst.

The reaction conditions and speeds were as in Example 13. After 2 hours 45 minutes of polymerization the reaction mass was transferred to the second autoclave and mixed with 100 kg. of vinyl chloride and 20 g. of ADBN. The speed of the paddle wheels was 30 r.p.m. The polymerization continued 12 hours 15 minutes longer. The yield was 71.8 percent of spherical granules of K value 62 and apparent density 0.55. The granulometry was:

TABLE XIV

| Screen apertures in microns | 630 | 500 | 400 | 315 | 250 | 200 | 160 | 100 |
|---|---|---|---|---|---|---|---|---|
| % fallthrough | 99 | 99 | 98 | 97 | 95 | 93 | 90 | 1 |

The granulometry was concentrated in dimensions between 100 and 160 microns, only 11 percent being dispersed in other sizes.

EXAMPLE 15

The apparatus was the same as in Example 13. The prepolymerizer received 100 kg. of vinyl chloride and 5.55 g. of ACSP. The agitator rotated at 720 r.p.m., the temperature was 62° C., and the pressure 9.5 bars. After 1 hour 15 minutes the catalyzer had become inert and the polymerization mass was transferred to the autoclave of FIG. 3 where it was mixed with 100 kg. of vinyl chloride and 40 g. of ADBN. The speed of agitation was 30 r.p.m., the temperature 62° C. and the pressure 9.5 bars. The reaction continued for another 11 hours 30 minutes. After venting, the yield was 70.6 percent of a polymer having a K value of 62 and an apparent density of 0.56. The granulometry was:

TABLE XV

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 97 | 92 | 90 | 2 |

The following comparisons are noted: compared to Examples 13 and 14 the total time of reaction was less, providing higher utility for the apparatus employed. The granulometry in the present example was concentrated, 90 percent being less than 160 microns and 88 percent being between 100 and 160 microns.

EXAMPLE 16

The apparatus of Example 13 was used. The prepolymerizer received 70 kg. of vinyl chloride monomer and 3.885 g. of ACSP, rapid catalyst. After 1 hour 15 minutes of prepolymerization at 720 r.p.m., 62° C. and 9.5 bars the catalyst had become inert, the mass latent, and it was transferred to the second autoclave with 140 kg. of vinyl chloride and 42 g. of ADBN, slow catalyst. Reaction was continued for 12 hours 30 minutes at 62° C., 30 r.p.m. and 9.5 bars. The yield was 69.7 percent of a spherical product having apparent density 0.49 and the granulometry was:

TABLE XVIa

| Screen apertures in microns | 630 | 500 | 400 | 315 | 250 | 200 | 160 | 100 |
|---|---|---|---|---|---|---|---|---|
| % fallthrough | 99 | 98 | 98 | 97 | 92 | 78 | 22 | 4 |

The density was less than that of the polymers of Examples 13, 14 and 15, the granulometry was more dispersed, and the mean dimensions of the particles were greater, which is advantageous for some purposes.

The same process was carried out with the sole exception that the prepolymerizer agitator was driven at 1,440 r.p.m. The product had the following granulometry:

TABLE XVIb

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 97 | 91 | 78 | 4 |

The apparent density was 0.49. The product was dispersed in fewer sizes, 91 percent being less than 200 microns and 74 percent between 100 and 160 microns.

EXAMPLE 17

The apparatus was the same as in examples immediately preceding. The prepolymerizer received 95 kg. of vinyl chloride and 5 kg. of vinyl acetate. 5.5 g. of ACSP provided 0.0004 percent of active oxygen. After 1 hour 15 minutes of prepolymerization at 720 r.p.m., 62° C. and 9.5 bars, the rapid catalyst was inert, the reaction mass latent, and it was transferred to the second autoclave with 95 kg. of vinyl chloride and 5 kg. of vinyl acetate. 40 g. of ADBN were added (0.02 percent of the total charge). Reaction proceeded 10 hours 15 minutes at 62° C., 30 r.p.m. and 9.5 bars. The yield was 75.2 percent of a spherical product having an apparent density of 0.68 and a K value of 56. The granulometry was:

TABLE XVII

| Screen apertures in microns | 630 | 500 | 400 | 315 | 250 | 200 | 160 | 100 |
|---|---|---|---|---|---|---|---|---|
| % fallthrough | 99 | 98 | 98 | 96 | 94 | 85 | 62 | 1 |

Eighty-five percent of the particles were less than 200 microns and 61 percent were between 100 and 160 microns.

EXAMPLE 18

The apparatus employed is the prepolymerizer of FIG. 1 and the fixed horizontal cylindrical autoclave of FIG. 4. The prepolymerizer was as described hereinabove being of 200 l. capacity of stainless steel equipped with a propeller type stirrer 180 mm. in diameter. It received 170 kg. of vinyl chloride and 30.6 g. of ADBN. Prepolymerization was at 62° C., 710 r.p.m., 9.5 bars, and continued for 2 hours. The secondary autoclave was of 500 l. capacity having a stirrer as represented in FIG. 4. After the transfer, which took 1 minute, the polymerization continued under identical conditions for 14 hours at 8 r.p.m. The yield was 72.6 percent of a powder having a K value of 62 and an apparent density of 0.58. The granulometry was:

TABLE XVIII

| Screen apertures in microns | 630 | 500 | 400 | 315 | 250 | 200 | 160 | 100 |
|---|---|---|---|---|---|---|---|---|
| % fallthrough | 99.5 | 99 | 98 | 96 | 96 | 84.5 | 27 | 1 |

This example was for comparative purposes.

EXAMPLE 19

The apparatus used was the same as that of Example 18 but the monomer was divided about in two. The prepolymerizer received 100 kg. of it and 20 g. of ADBN. Prepolymerization continued for 2 hours 30 minutes under the conditions of Example 18 and the reaction mass was transferred to the cylindrical autoclave where it received 100 kg. of monomer and 20 g. of ADBN. The agitator was rotated at 8 r.p.m. and the process continued for 12 hours 45 minutes. The product had a yield of 70.7 percent, a K value of 62, and an apparent density of 0.56. Its granulometry was:

TABLE XIX

| Screen apertures in microns | 630 | 500 | 400 | 315 | 250 | 200 | 160 | 100 |
|---|---|---|---|---|---|---|---|---|
| % fallthrough | 99 | 98 | 98 | 97 | 94 | 92 | 89 | 2 |

Compared to the product of Example 18 the concentration of sizes was much improved, 87 percent being between 100 and 160 microns. The product was composed of spheres. The advantage of growing the minute particles of polymer produced in the prepolymerizer in fresh monomer is apparent.

EXAMPLE 20

In this example the prepolymerization took place in the presence of a catalyst of rapid decomposition and the secondary stage of polymerization in the presence of a catalyst of slow decomposition. A prepolymerizer received 100 kg. of vinyl chloride and 5.55 g. of ACSP, providing 0.0004 percent of active oxygen based on the weight of the monomer fraction in the prepolymerizer. The speed was 710 r.p.m., the temperature 62° C. and the pressure 9.5 bars. After 1 hour 15 minutes the catalyst was inert and polymerization had ceased. The polymerization mass containing minute seeds of polymer in unpolymerized liquid monomer was transferred to the second autoclave and mixed with 100 kg. of vinyl monomer and 40 g. of ADBN. The agitator was driven at 8 r.p.m., the temperature was 62° C. and the pressure 9.5 bars. Polymerization continued 11 hours 15 minutes. The yield was 71.2 percent, the K value 62, and the apparent density 0.56. The granulometry was:

TABLE XX

| Screen apertures in microns | 630 | 500 | 400 | 315 | 250 | 200 | 160 | 100 |
|---|---|---|---|---|---|---|---|---|
| % fallthrough | 99 | 99 | 99 | 97 | 96 | 93 | 89 | 1 |

If the results of Examples 18, 19 and 20 be compared, it will be observed that for identical yields the duration of the operation was less in Example 20 and that the granulometric concentration of sizes is equally good, 89 percent of particles being less than 160 microns and 88 percent between 100 and 160 microns.

EXAMPLE 21

The apparatus of Example 18 was used. The prepolymerizer received 70 kg. of vinyl chloride and 3.885 g. of ACSP. After 1 hour 15 minutes at 710 r.p.m., 62° C. and 9.5 bars, the rapid catalyst was substantially destroyed and the polymerization had ended. The mass was transferred to the other autoclave and mixed with 140 kg. of vinyl chloride. Forty-two grams of ADBN were added and the reaction continued at the same temperature, pressure and velocity of agitation for 12 hours 15 minutes. The yield was 69.4 percent having a density of 0.48 and a K value of 62. The granulometry was:

TABLE XXIa

| Screen apertures in microns | 630 | 500 | 400 | 315 | 250 | 200 | 160 | 100 |
|---|---|---|---|---|---|---|---|---|
| % fallthrough | 98 | 98 | 98 | 96 | 91 | 80 | 20 | 3 |

The apparent density of the spherical particles was less and the sizes were more widely distributed.

In order to produce a more concentrated product, the identical process was carried out using 1,420 r.p.m., in the prepolymerizer. The granulometry was:

TABLE XXIb

| Screen apertures in microns | 630 | 500 | 400 | 315 | 250 | 200 | 160 | 100 |
|---|---|---|---|---|---|---|---|---|
| % fallthrough | 99 | 99 | 99 | 97 | 97 | 92 | 75 | 5 |

The density was 0.48.

EXAMPLE 22

Under identical conditions and in the same apparatus as Example 18, 95 kg. of vinyl chloride and 5 kg. of vinyl acetate were polymerized in the presence of a rapid catalyst yielding 0.0004 percent of active oxygen. After 1 hour 15 minutes this was mixed in the second autoclave with 95 kg. of vinyl chloride, 5 kg. of vinyl acetate, and 40 g. of a rapid catalyst providing 0.02 percent of the total weight of the charge. Reaction continued for 10 hours 15 minutes for a yield of 73.6 percent, a density of 0.66 and a K value of 56. The granulometry was:

TABLE XXII

| Screen apertures in microns | 630 | 500 | 400 | 315 | 250 | 200 | 160 | 100 |
|---|---|---|---|---|---|---|---|---|
| % fallthrough | 99 | 98 | 97 | 96 | 92 | 84 | 58 | 2 |

In the following examples the second stage autoclave was a fixed vertical cylinder having a spiral agitator of blade type rotating adjacent the wall in such a manner that it elevated the product from the bottom alongside the cold wall and transferred it inwardly to descend again along the axis of the cylinder.

EXAMPLE 23

A vertical autoclave of 1,000 l. capacity, of stainless steel, having a 300 mm. impeller driven at 720 r.p.m. received 800 kg. of vinyl chloride and 144 g. (0.018 percent) of ADBN. The temperature was 62° C. and the pressure was 9.5 bars. After 2 hours of polymerization the mixture was transferred to the vertical autoclave which was of 2m³. capacity provided with the vertical helical agitator and already contained 800 kg. of vinylchloride. The speed of the agitator was 10 r.p.m., the temperature was 62° C. and the pressure 9.5 bars. Polymerization continued for another 13 hours. The yield was 70.8 percent of spherical granules having a K value of 62 and an apparent density of 0.52. The granulometry was:

TABLE XXIII

Screen apertures

| in microns | 630 | 500 | 400 | 315 | 250 | 200 | 160 | 100 |
|---|---|---|---|---|---|---|---|---|
| % fallthrough | 99 | 98 | 98 | 98 | 97 | 93 | 90 | 1 |

An identical test at which the helical agitator was rotated at 5 r.p.m. produced a comparable result.

EXAMPLE 24

The apparatus of Example 23 received 500 kg. of vinyl chloride monomer and 100 g. of ADBN (0.02 percent). Other conditions were identical. After 2 hours of prepolymerization the mass was transferred to the second autoclave and mixed with 500 kg. of vinyl chloride and 100 g. of ADBN. The helical agitator was run at 10 r.p.m. Other conditions were the same and the duration was 12 hours. The yield was 73.2 percent and the K value was 62 and the apparent density 0.62 of spherical granules, the granulometry of which was:

TABLE XXIV

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 97 | 90 | 88 | 1 |

The density of the product was superior to that of Example 23 and the granulometry was about equally concentrated.

EXAMPLE 25

The prepolymerizer received 500 kg. of the same monomer and 27.75 g. of ACSP (0.0004 percent of active oxygen). The other conditions were identical with the preceding example. After 1 hour 15 minutes the rapid catalyst and the process were inert and the charge was mixed with 500 kg. of vinyl chloride and 200 g. of ADBN in the second autoclave. The conditions were identical except that polymerization went 11 hours 15 minutes in addition to the time in the prepolymerizer. The yield was 72.8 percent, the K value 62 and the apparent density 0.63. The granulometry was:

TABLE XXV

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 98 | 93 | 91 | 2 |

For a yield approximately the same the total duration of the process of the present examples was less. The density of the products of Examples 24 and 25 was greater than that of Example 23.

EXAMPLE 26

The apparatus was the same as in the preceding example. The prepolymerizer received 350 kg. of vinyl chloride and 19.425 g. of ACSP. After 1 hour 15 minutes at 720 r.p.m., 62° C., and 9.5 bars, the reaction became latent and the mass was transferred to the second stage autoclave where it was mixed with 700 kg. of vinyl chloride and 210 g. of ADBN. The reaction continued 11 hours 45 minutes. The yield was 70.2 percent, the density was 0.50 and the K value 62. The granulometry was:

TABLE XXVIa

| Screen apertures in microns | 630 | 500 | 400 | 315 | 250 | 200 | 160 | 100 |
|---|---|---|---|---|---|---|---|---|
| % fallthrough | 99 | 98 | 98 | 97 | 92 | 80 | 25 | 2 |

The apparent density of the product of this example was inferior to that of the two preceding examples and the distribution of spheres more widely distributed in larger sizes, it being noted that the monomer subjected to prepolymerization represented one-third of the total monomer and that the speed of the prepolymerizer agitator was 720 r.p.m.

When the same example was carried out with a speed of 1,440 r.p.m in the prepolymerizer, the granulometry was:

TABLE XXVIb

| Screen apertures in microns | 630 | 500 | 400 | 315 | 250 | 200 | 160 | 100 |
|---|---|---|---|---|---|---|---|---|
| % fallthrough | 99 | 99 | 99 | 98 | 95 | 90 | 80 | 1 |

The density was 0.5, the granulometry was more concentrated in smaller sizes.

EXAMPLE 27

The apparatus was as in the preceding example. The prepolymerizer received 475 kg. of vinyl chloride, 25 kg. of vinyl acetate, and 27.75 g. of ACSP (0.0004 percent) of active oxygen). After 1 hour 15 minutes of polymerization at 62° C., 9.3 bars and 720 r.p.m., the mass was transferred to the second stage autoclave and mixed with 475 kg. of vinyl chloride, 25 kg. of vinyl acetate and 200 g. of ADBN. The reaction proceeded 9 hours 45 minutes under the same conditions. The yield was 74.1 percent. The product had an apparent density of 0.69 and a K value of 56. The granulometry was:

TABLE XXVII

| Screen apertures in microns | 630 | 500 | 400 | 315 | 250 | 200 | 160 | 100 |
|---|---|---|---|---|---|---|---|---|
| % fallthrough | 99 | 99 | 98 | 98 | 95 | 90 | 75 | 1 |

In the preceding description no attempt has been made to list the ethylenic monomers which can be polymerized by this process and in this apparatus. However, the process is applicable to all ethylenic monomers which can be polymerized by standard processes. It is particularly advantageous when applied to the polymerization of vinyl chloride in the presence of compatible monomers. It is to be understood that the process is polymerization in mass and is applicable to all monomers which can be polymerized in mass, that is to say in the absence of solvents and diluents.

Only a few catalysts have been used in the examples but that has been to provide comparative data. All catalysts which are useful in the mass polymerization of ethylenic monomers can be used in association with their monomer. For use with vinyl chloride the organic peroxide catalysts are preferred.

The preferred form of apparatus employs a prepolymerizer of the type shown in FIG. 1 but apparatus has been successfully constructed and operated with prepolymerizers of the type shown in FIGS. 2, 3 and 4. In comparing such different constructions, it is not proper to compare the speeds one with another because a speed of 1,000 r.p.m. with a turbine type impeller may have no more turbulent effect than a speed of 130 r.p.m. with the paddle wheel of FIG. 3. The temperature employed in the process are those which are customarily used in the polymerization of ethylenic monomers in mass. Those given here are mean values for the polymerization of vinyl chloride. They are not to be considered limitations because polymerization by this process will proceed to superior results under comparable conditions. For compatible monomers polymerizable in mass, for lists of catalysts and conditions of reaction favorable to polymerization of such monomers in mass prior publications may be consulted.

As many apparently widely different embodiments of the present invention may be made without departing from the spirit and scope thereof, it is to be understood that the invention is not limited to the specific embodiments.

What is claimed is:

1. A method of polymerizing ethylenic monomers capable of polymerization in mass, to form spherical particles with controlled size distribution, which comprises subjecting an ethylenic monomer in mass to conditions of temperature, pressure, and catalysis favorable to polymerization in a locus provided with agitation of sufficient violence to achieve major turbulence in the reaction mass until about 7 to 15 percent polymerization has been attained, the minute particles of polymer thus formed being suspended in liquid monomer, transferring the liquid suspension to another locus provided with mild agitation, mixing it with an additional body of monomer of at least substantially the same quantity as the original monomer, and continuing the polymerization in mass at a lower rate under conditions favorable to the growth of the particles, including agitation which is substantially milder than in the first locus and is a function of good temperature control and achieves at the most minor turbulence and conditions of temperature, pressure, and catalysis favorable to polymerization.

2. A method according to claim 1 in which the monomer comprises vinyl chloride.

3. A method according to claim 2 in which the monomer submitted to turbulent agitation is from about one-third to one-half of the total quantity of monomer employed in the process.

4. A method according to claim 1 which comprises selecting a turbulence of agitation in the first step of polymerization and thereby controlling the granulometry of the product.

5. A method according to claim 1 in which the first stage of polymerization includes a rapid catalyst and the second stage includes a slow catalyst.

6. A method according to claim 1 in which the monomer includes vinyl chloride and a compatible ethylenic monomer.

7. A method according to claim 6 in which the compatible monomer is vinyl acetate.

8. A method according to claim 2 in which the first stage of polymerization is carried out with turbulence equivalent to that produced by a turbine type agitator at many hundreds of r.p.m. and the second stage is carried out with turbulence equivalent to that produced by a blade type agitator rotating at less than 100 r.p.m.

9. A method of polymerizing ethylenic monomers capable of polymerization in mass, to form spherical particles with controlled size distribution, which comprises subjecting an ethylenic monomer in mass to conditions of temperature, pressure, and catalysis favorable to polymerization in a reaction vessel provided with agitation of sufficient violence to achieve major turbulence in the reaction mass until about 7 to 15 percent polymerization has been attained, the minute particles of polymer thus formed being suspended in liquid monomer, transferring the liquid suspension to another reaction vessel provided with mild agitation, mixing it with an additional body of monomer of at least substantially the same quantity as the original monomer, and continuing the polymerization in mass at a lower rate under conditions favorable to the growth of the particles, including agitation which is substantially milder than in the first reaction vessel and is a function of good temperature control and achieves at the most minor turbulence and conditions of temperature, pressure, and catalysis favorable to polymerization, rinsing the reaction vessel with monomer, and adding the rinse to the partly polymerized mass in the second reaction vessel.

10. A method of polymerizing ethylenic monomers capable of polymerization in mass, to form spherical particles with controlled size distribution, which comprises subjecting an ethylenic monomer in mass to conditions of temperature, pressure, and catalysis favorable to polymerization in a reaction vessel provided with agitation of sufficient violence to achieve major turbulence in the reaction mass until about 7 to 15 percent polymerization has been attained, the minute particles of polymer thus formed being suspended in liquid monomer, transferring the liquid suspension to another reaction vessel provided with mild agitation, mixing it with an additional body of monomer of at least substantially the same quantity as the original monomer, and continuing the polymerization in mass at a lower rate under conditions favorable to the growth of the particles, including agitation which is substantially milder than in the first reaction vessel and is a function of good temperature control and achieves at the most minor turbulence and conditions of temperature, pressure, and catalysis favorable to polymerization, rinsing the reaction vessel with monomer, and adding the rinse to the partly polymerized mass in the second reaction vessel and adding a catalyst to the reaction liquid in the second reaction vessel.

11. A method according to claim 1 in which the catalyst employed in the first stage is of slow type and in quantity which exhausts itself before the polymerization exceeds about 15 percent.

* * * * *

UNITED STATES PATENT OFFICE
CERTIFICATE OF CORRECTION

Patent No. 3,687,919          Dated August 29, 1972

Inventor(s) JEAN CLAUDE THOMAS

It is certified that error appears in the above-identified patent and that said Letters Patent are hereby corrected as shown below:

Title Page, Column 1, at "[30]", add -- March 18, 1965 France..659756, March 19, 1965 France..659915, March 22, 1965 France..6510180, March 23, 1965 France..6510328 --.

Signed and sealed this 6th day of March 1973.

(SEAL)
Attest:

EDWARD M. FLETCHER, JR.
Attesting Officer

ROBERT GOTTSCHALK
Commissioner of Patents